United States Patent
Westerman

(10) Patent No.: US 6,346,977 B1
(45) Date of Patent: Feb. 12, 2002

(54) REFLECTIVE LIQUID CRYSTAL DISPLAY PANEL WITH DIFFRACTION GRATING BETWEEN PIXEL ELECTRODES

(75) Inventor: Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/407,023

(22) Filed: Sep. 28, 1999

(51) Int. Cl.$^7$ .......................... G02F 1/1333; G02B 5/18
(52) U.S. Cl. ........................ 349/158; 359/572
(58) Field of Search .................... 349/113, 193, 349/201, 158, 100; 359/572, 569

(56) References Cited

U.S. PATENT DOCUMENTS

| | | | |
|---|---|---|---|
| 4,729,641 A | * 3/1988 | Matsuoka et al. | 350/248 |
| 5,012,274 A | 4/1991 | Dolgoff | |
| 5,452,385 A | * 9/1995 | Izumi et al. | 385/37 |
| 5,615,024 A | * 3/1997 | May et al. | 349/158 |
| 5,706,067 A | 1/1998 | Colgan et al. | |
| 5,847,789 A | 12/1998 | Nakamura et al. | |
| 5,875,012 A | 2/1999 | Crawford et al. | |

FOREIGN PATENT DOCUMENTS

JP 61-151618 * 7/1986

* cited by examiner

Primary Examiner—Toan Ton
Assistant Examiner—Dung Nguyen
(74) Attorney, Agent, or Firm—Marger Johnson & McCollom, PC; Gregory T. Kavounas

(57) ABSTRACT

A reflective liquid crystal display panel has a two-dimensional array of reflective pixel electrodes. A diffraction grating is provided in the border spaces between the neighboring reflective electrodes. The diffraction grating diffracts the incident light sideways, thereby subtracting it from the total returned light, which increases the available optical contrast. The diffraction grating is tuned to the peak wavelength of the ambient illumination. It is formed as additional structure on the substrate during fabrication. The structure uses raised mesas arranged in a checker board pattern. The mesas define floors between them, and have roofs that are raised from the floors by a quarter wavelength.

18 Claims, 4 Drawing Sheets

REFLECTIVE LIQUID CRYSTAL DISPLAY PANEL WITH DIFFRACTION GRATING BETWEEN PIXEL ELECTRODES

BACKGROUND OF THE INVENTION

1. Field of the Invention

The present invention is related to the field of reflective liquid crystal display panels, and more specifically to additional structure within such panels for improving the available contrast ratio.

2. Description of the Related Art

Reflective panel LCD projectors use reflective liquid crystal display panels. These panels are illuminated by background light, and modulate spatially the amount of reflected light.

Referring to FIG. 1, a prior reflective liquid crystal display panel 30 is described. The panel 30 is illuminated by background light incident upon it from the normal direction 34. The panel includes a transparent cover plate 42, onto which are attached transparent electrodes 44. The device has a substrate 50, onto which the reflective pixels are defined. A space between the transparent cover plate 42 and the substrate 50 is filled with liquid crystal material 70.

The reflective pixels are made by reflective pixel electrodes 52, 54, 56, 58, formed on respective pixel control transistors 62, 64, 66 and 68. The reflective pixel electrodes 52, 54, 56 and 58 apply electric fields to respective adjacent portions of the liquid crystal material 70. This controls optical properties of the adjacent portion of the liquid crystal material 70, which in turn controls the amount of light that reaches each reflective pixel electrode, and returns back out through the liquid crystal material 70.

A problem in the prior art arises from reflections from the substrate 50 in the inactive areas 82, 84, 86. These inactive areas 82, 84, 86 are between the reflective pixel electrodes 52, 54, 56 and 58, and are also known as border spaces. Reflections from these border spaces 82, 84, 86 limit the amount of optical contrast available from the panel.

Referring now to FIG. 2, the prior art problem is described in better detail. More specifically, the reflections from three rays 102, 104, 106, of illuminating background light are considered. FIG. 2 does not show the liquid crystal material or the transparent cover plate, but only the reflections of the incident light from the whole panel with respect to the positions of reflective electrodes. In fact, the returned rays go through the liquid crystal material, etc.

Ray 102 is received by electrode 54, which is in a reflection mode. (The reflection mode is denoted by showing electrode 54 with hatched lines.) A ray 112 is returned to the viewer. Ray 104 is received by electrode 56, which is in a non-reflection mode. (The non-reflection mode is denoted by showing electrode 56 without hatched lines. It is understood that the external appearance of electrodes 54 in 56 is the same regardless of the mode.) A ray 114 is returned to the viewer. It is to be noted that returned ray 114 is generally much smaller than returned ray 112. Ideally ray 114 has zero magnitude.

The problem arises from the reflection of ray 106. Ray 106 impinges in border space 84, and returns a ray 116 that is of fixed magnitude. Ray 116 arises from the fact that typically the substrate 50 is flat in border space 84. Ray 116 cannot be modulated by being turned on or off, because there is no electrode in the corresponding location for the liquid crystal material. Thus the light from ray 116 is added to the total returned light, which sets a fundamental limit to the amount of optical contrast available from the panel.

A number of approaches have been tried in the prior art. One such approach is to make a width of border space 84 as small is possible. This approach can only be carried so far, as neighboring electrodes can have different voltages, which would result in interference from fringing electric fields by neighboring pixels that are too close.

Another approach, taught in U.S. Pat. No. 5,012,274, is to place an LCD image projection system at the transparent cover plate, so as to diminish the effect of reflections from the border spaces. This approach, however, is expensive because it requires optical components, and also ignores the fact that light reflected from the border spaces will still pass through the optical system, resulting in stray background light in the off condition, thereby limiting the available optical contrast of the device.

BRIEF SUMMARY OF THE INVENTION

The present invention overcomes these problems and limitations of the prior art.

Generally, the present invention provides a reflective liquid crystal display panel that has a two-dimensional array of reflective pixel electrodes. A diffraction grating is provided in the border spaces between the neighboring reflective electrodes. The diffraction grating diffracts the incident light sideways, thereby subtracting it from the total returned light, which increases dramatically the resulting optical contrast of the panel of the invention. As such, the diffraction grating is preferably tuned to the peak wavelength of the ambient illumination.

Preferably the diffraction grating is formed as additional structure on the substrate during fabrication. The preferred diffraction grating uses raised mesa structures arranged in a checker board pattern. The mesa structures define floors between them, and have roofs that are raised from the floors by a quarter wavelength. Thus a whole band of wavelengths is diffracted away.

The foregoing and other features and advantages of the invention will become more readily apparent from the following detailed description of a preferred embodiment, which proceeds with reference to the drawings.

DETAILED DESCRIPTION OF THE PREFERRED EMBODIMENT(S)

As has been mentioned, the present invention provides a reflective liquid crystal display panel, which is now described in detail with reference to the drawings.

Figure 1:
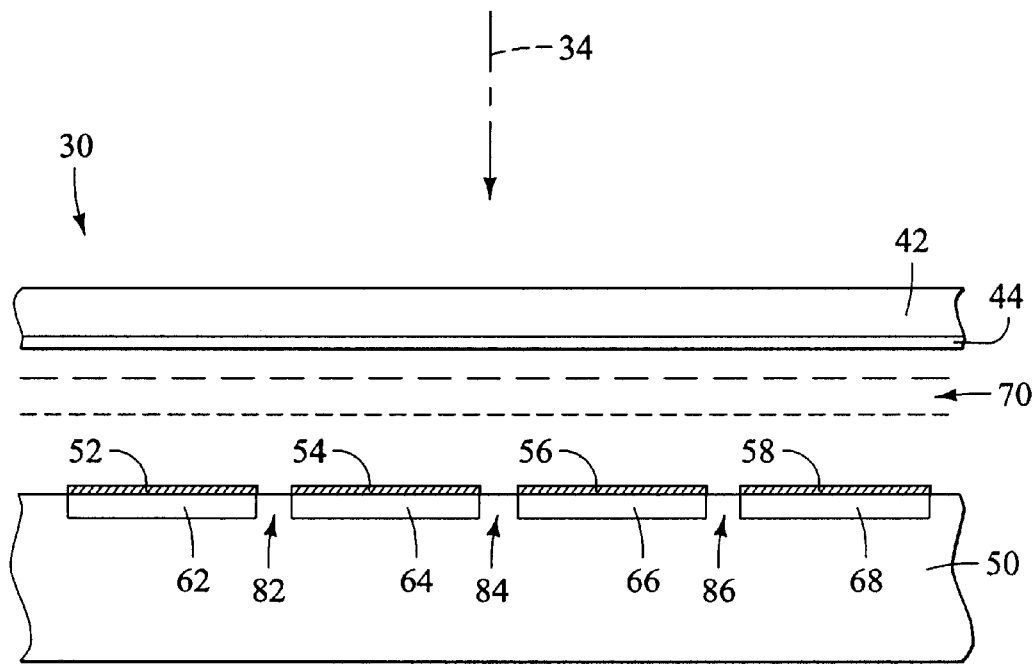
FIG. 1 is a section view of a prior reflective liquid crystal display panel.
Figure 2:
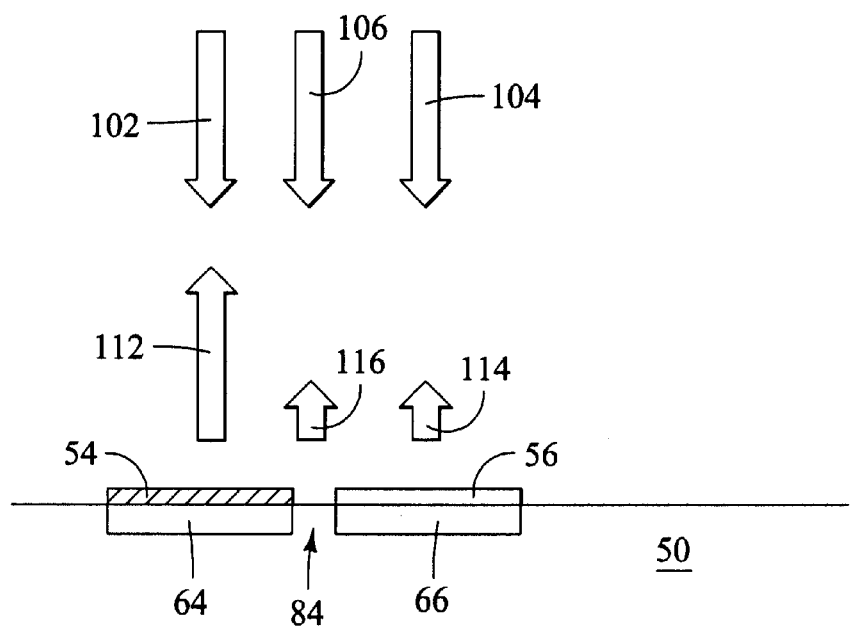
FIG. 2 is an iconic description for explaining the operation of a portion of the panel of FIG. 1.
Figure 3:
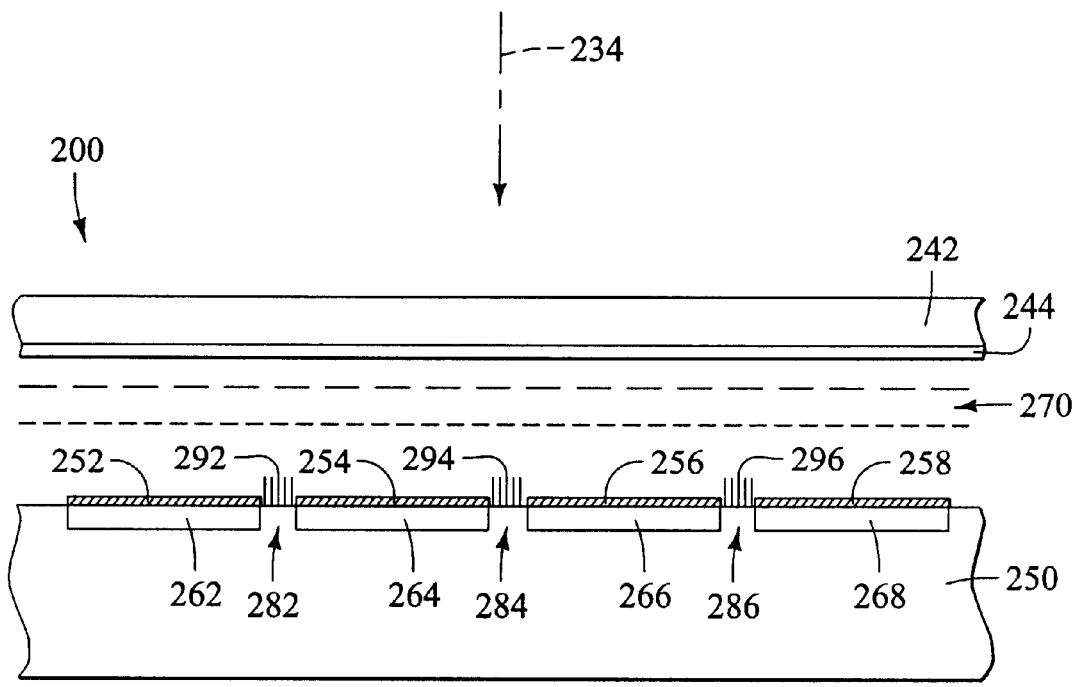
FIG. 3 is a section view of a reflective liquid crystal display panel made according to a general embodiment of the present invention.

Referring to FIG. 3, a reflective liquid crystal display panel 200 is described according to a general embodiment of the invention. The panel 200 is illuminated by background light from a general direction 234, that is typically normal to a plane of the panel 200. The background light has a range of illumination wavelengths. Of those wavelengths, a peak wavelength $\lambda_P$ is considered for optimizing the invention as will become evident from this description.

The panel 200 includes a transparent cover plate 242, onto which there are attached transparent electrodes 244. The panel 200 preferably has a substrate 250, onto which reflective pixel electrodes are formed as is described below. A space between the transparent cover plate 242 and the substrate 250 is filled with liquid crystal material 270. Embodiments without the substrate 250 are included within this invention. Indeed, what matters for practicing the invention is the locations of the electrodes that define the reflective pixels with respect to each other, and that the electrodes be located proximately to the liquid crystal material 270.

The panel 200 further includes reflective pixel electrodes 252, 254, 256 and 258. These are preferably formed on respective pixel control transistors 262, 264, 266 and 268, which preferably are formed on substrate 250. In a typical complete device made according to the invention, the active pixel areas will be filled with multiple layers of fabricated elements, with the reflective electrode surfaces being uppermost. The reflective pixel electrodes 252, 254, 256 and 258 define between them inactive areas, also known as border spaces 282, 284 and 286. Background light coming from direction 234 goes through liquid crystal material 270, and is received by the reflective pixel electrodes 252, 254, 256, 258, and also border spaces 282, 284, 286, and thus also by whatever structure is found on the border spaces.

The reflective pixel electrodes 252, 254,256 and 258, in combination with transparent electrodes 244, set up electric fields in respective corresponding portions of the liquid crystal material 270. These electric fields modulate the optical properties of the liquid crystal material, and thereby modulate the reflectivity of the corresponding portions of the liquid crystal material 270, and thus the overall image seen by viewer from direction 234.

A key part of the invention is to provide diffraction gratings 292, 294, 296 in at least some of the border spaces 282, 284, 286, respectively. The diffraction greetings 292, 294, 296 are tuned to at least one grating wavelength $\lambda_G$. Preferably the grating wavelength $\lambda_G$ is chosen to be at a peak wavelength $\lambda_P$ of the range of illumination wavelengths. For example, if the illumination is by sunlight, the peak is around the wavelength of the yellow color. The diffraction greetings 292,294, 296 improve the overall light contrast between neighboring pixels, as is explained immediately below.

Figure 4:
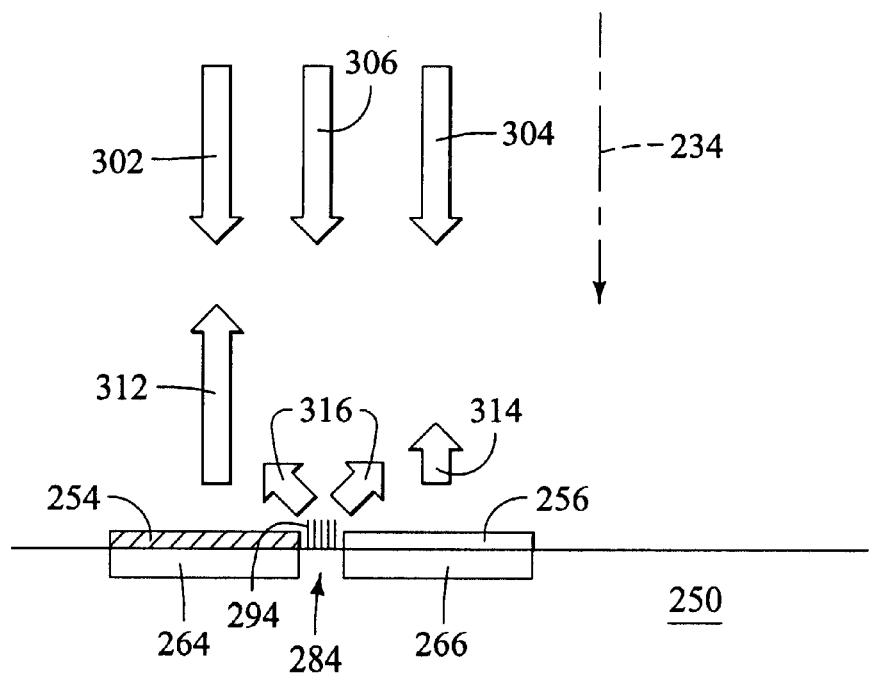
FIG. 4 is an iconic description for explaining the operation of a portion of the panel of FIG. 3.

Referring now to FIG. 4, the operation of the diffraction gratings of the panel of the invention is described by examining in detail light reflections from electrodes 254, 256, and from diffraction grating 294 located in border space 284, which is between electrodes 254 and 256.

More specifically, the reflections from three rays 302, 304, 306, of illuminating background light are considered. The diagram does not show the liquid crystal material or the transparent cover plate, but the reflection of the incident light from the whole panel with respect to the positions of reflective electrodes 254 and 256. In fact, the returned rays go through the liquid crystal material (not shown).

Ray 302 is received by electrode 254, which is in a reflection mode. A ray 312 is returned to the viewer, who is viewing from the normal. Ray 304 is received by electrode 256, which is in a non-reflection mode. A ray 314 is returned to the viewer. Again, returned ray 314 is generally much smaller than returned ray 112, and ideally zero.

Ray 306 reaches diffraction grating 294 and is diffracted into rays 316. Rays 316 are in different directions than the normal. As such, the light of rays 316 not added to the total returned light of the other returned rays 312, 314. This improves the optical contrast made available from the device 200 of the invention, as compared to the prior panel 30.

Figure 5:
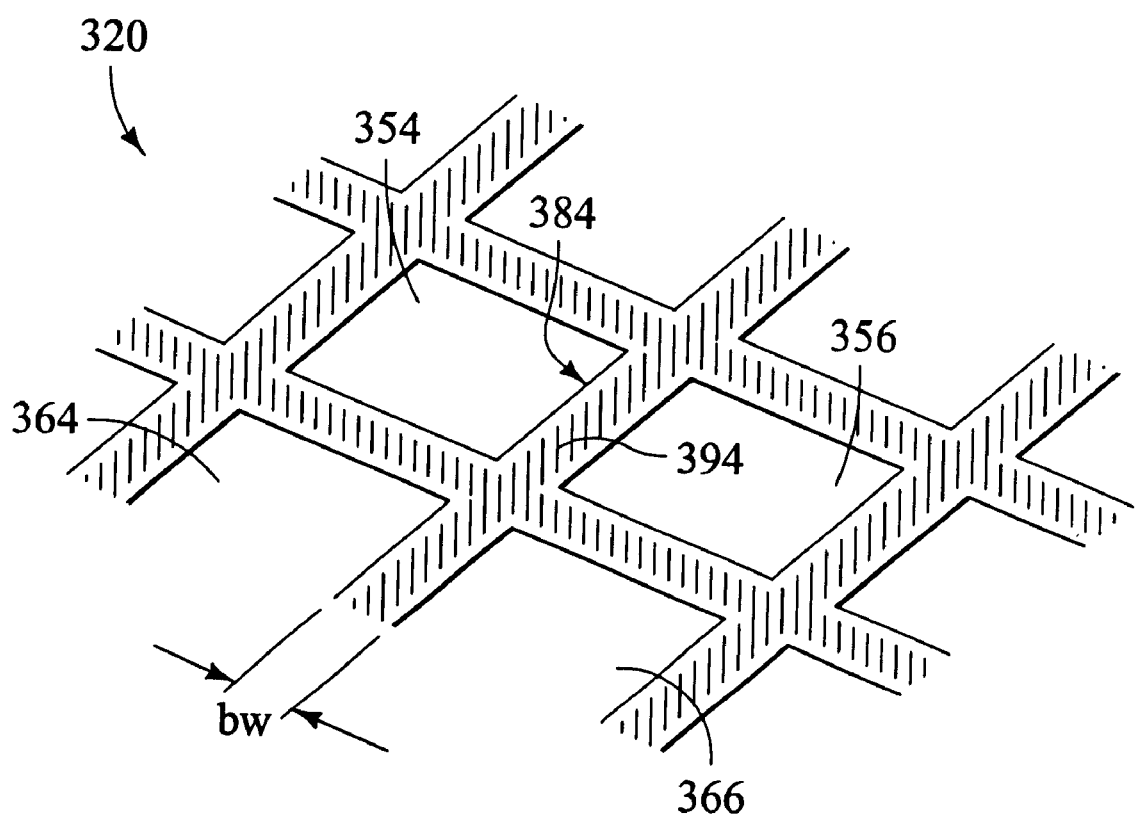
FIG 5 is a perspective view of pixel electrodes of a reflective liquid crystal display panel made according to the preferred embodiment of the invention.

Referring now to FIG. 5, additional properties of the preferred diffraction grating of the present invention are described. It must first be appreciated that transitioning from the section views of FIGS 3 and 4 to the perspective view of FIG. 5 introduces perceptual differences.

An array 320 includes at least four reflective pixel electrodes 354, 356, 364, 366. A border space 384 is defined between electrodes 354, 356. It will be appreciated, however, that many other border spaces are defined between the other combinations of neighboring electrodes, and that all such a border spaces communicate with each other. In other words, the aggregation of the border spaces can be seen as a continuous single border space. Since the array 320 is made from identically shaped rectangular pixels that are further rectangularly arranged, the border space between any two neighboring pixels will have a uniform width bw.

The array 320 includes a diffraction grating 394 in border space 384. The diffraction grating 384 preferably has a geometric pattern that causes light which is normally incident upon the surface of the array 320 to be preferentially diffracted to angles away from the perpendicular, and thus away from the normal. The diffracted light rays (rays 316 of FIG. 4) can then be removed from the remainder of the light reflected from the pixelated portion of the display. Such removal can be accomplished by a diaphragm. A diaphragm will have a minimal effect upon the light reflected from the active reflective pixel areas.

The diffraction grating 394 of FIG. 5 is the preferred diffraction grating according to the invention. Its structure is explained in more detail below. Preferably the. diffraction grating 394 covers the entire border space of the entire array, although that is not necessary. A different type of structure can be implemented.

The preferred diffraction grating according to the invention is now described with reference to FIG. 6 and FIG. 7. It is preferred that the diffraction grating is formed directly on the substrate. Thus an advantage of the present invention is that the diffraction grating can be manufactured at the time of manufacturing the remaining structure on the substrate. This makes the present invention more economical to implement.

Figure 6:
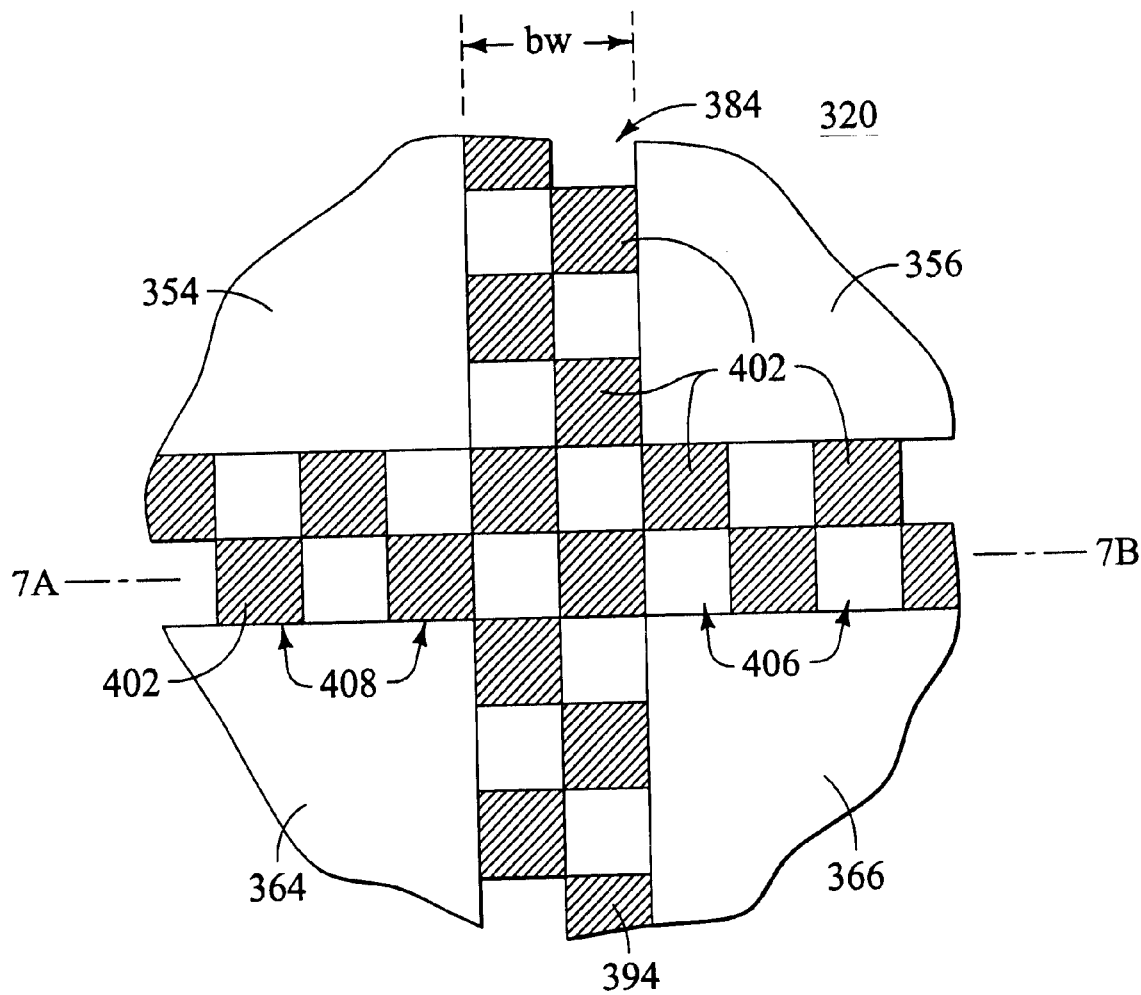
FIG. 6 is a top view of the panel of FIG. 5, using the preferred diffraction grating according to the invention.

Referring to FIG. 6, the preferred diffraction grating 394 is shown at the intersection of electrodes 354, 356, 366 and 364. The diffraction grating 394 includes mesas 402, also known as mesa structures and islands. The mesas 402 are preferably arranged in a periodic pattern. The preferred periodic pattern is a checker board pattern, as seen in FIG. 6.

Figure 7:
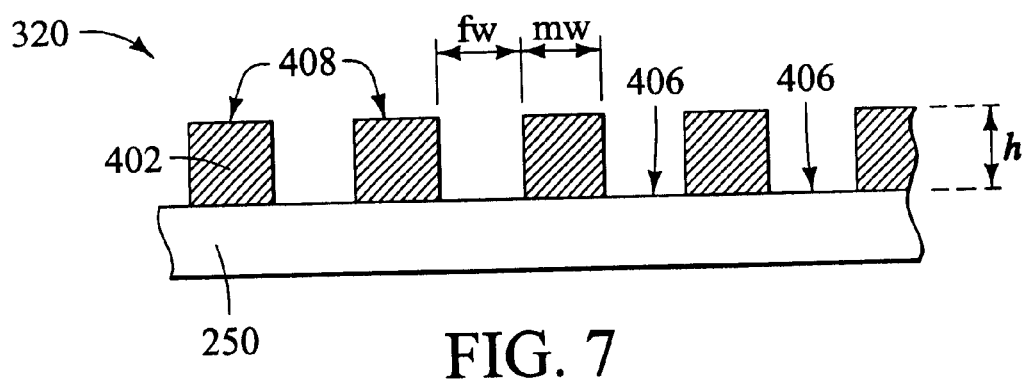
FIG. 7 is a section view along a line 7A–7B of FIG. 6.

Referring also to FIG. 7, the mesas 402 define between them floors 406. In the embodiment of FIGS. 6 and 7, each mesa 402 is rectangular, and has a mesa width mw. The floors 406 are flat, and have a floor width fw. Preferably, mw equals fw, and also mw equals half of bw, the width of the border space 384.

The preferred mesas 402 have roofs 408. The roofs 408 are raised with respect to the floors 406 by a height h. The height h is chosen to be an odd multiple of a quarter of the grating wavelength $\lambda_G$. This makes the diffraction grating to be tuned also to a band of wavelengths around the grating wavelength $\lambda_G$. The grating wavelength $\lambda_G$ is chosen such as the band in which the diffraction grating 394 will be tuned is within at least a portion of the range of the illumination wavelengths.

Calculations show that the diffraction grating 394 reduces the amount of reflection of normally incident light by two orders of magnitude over a wavelength band of 70 nm, centered around the preselected wavelength at which the diffraction grating is tuned. Off axis light will be attenuated by a lesser amount, but the combined reduction in reflection will generally exceed an order of magnitude. In other words, the invention reduces the amount of background light reflected by the border spaces by a factor of 10.

It should also be recognized that various configurations can be tried for deciding how high the diffraction grating should be placed with respect to the top surface of the pixel electrodes. Various heights can be tried. The height of the mesas 402 can be controlled during the fabrication process by selectively etching the substrate to a controlled depth, or by controlled selective deposition of material.

The mesas that form the diffraction grating need not have the 1:1 ratios described in FIGS. 6 and 7, although alteration of this ratio will affect the performance of the device. In fact, the mesas need not be square or rectangular, but can be of arbitrary shape.

In addition, the grating need not be tuned to a single wavelength, but can be tuned to a targeted band of wavelengths. This is accomplished by including appropriate height differences between the roofs of the mesas and the floors between them. The differences can be either in a continuous range, or be implemented as discrete height differences.

In addition, a grating according to the invention can be implemented by other techniques for introducing differential phase retardation to separate portions of the normally incident light. For example, the diffraction grating can be made by depositing on the substrate a plurality of elements that are transparent at least in part at the selected wavelength. For another example, the diffraction grating can be made by depositing on the substrate a plurality of metallic elements. These metallic elements would not be in electrical contact with each other, which is another way of saying that each metallic element is electrically open-ended. To form the diffraction grating, such elements would be periodically arranged, and the depth and optical properties of the materials would be controlled to effect the appropriate differential retardation to the wavefront of the incident light. Moreover, the above-described techniques can be combined with each other according to the invention.

A person skilled in the art will be able to practice the present invention in view of the present description, where numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. Applicant regards the subject matter of the invention to include all combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related application for patent.

The invention claimed is:

1. A reflective liquid crystal display panel comprising:
   liquid crystal material to be illuminated by light having a range of illumination wavelengths;
   at least two neighboring reflective pixel electrodes located proximately to respective portions of the liquid crystal material to receive the illuminating light through the liquid crystal material and to apply electric fields to the respective portions of the liquid crystal material, the electrodes defining a border space between them; and
   a diffraction grating tuned to at least one grating wavelength that belongs in at least a portion of the range of illumination wavelengths, the grating being located in at least a portion of the border space to receive the illuminating light through the liquid crystal material and to diffract the received light.

2. The panel of claim 1, wherein the diffraction grating covers the entire border space.

3. The panel of claim 1, further comprising:
   a substrate, and
   wherein the diffraction grating is formed on the substrate.

4. The panel of claim 3, wherein the diffraction grating covers the entire border space.

5. The panel of claim 3, where in
   the diffraction grating includes periodically arranged mesas formed on the substrate.

6. The panel of claim 5, wherein the diffraction grating covers the entire border space.

7. The panel of claim 5, wherein
   the mesas define floors between them, and
   the mesas have roofs that are raised with respect to the floors by an odd multiple of a quarter of the grating wavelength.

8. The panel of claim 7, wherein the diffraction grating covers the entire border space.

9. The panel of claim 5, wherein
   the border space has a width, and
   the mesas have a width half of the border space width.

10. The panel of claim 9, wherein the diffraction grating covers the entire border space.

11. The panel of claim 3, wherein the diffraction grating includes a plurality of electrically open ended metallic elements arranged periodically on the substrate.

12. The panel of claim 11, wherein the diffraction grating covers the entire border space.

13. The panel of claim 3, wherein the diffraction grating includes a plurality of elements that are transparent at least in part in at least a portion of the range of the illumination wavelengths and are periodically arranged on the substrate.

14. The panel of claim 13, wherein the diffraction grating covers the entire border space.

15. The panel of claim 3, wherein
   the diffraction grating is tuned to at least two distinct grating wavelengths belonging in at least a portion of the range of the illumination wavelengths.

16. The panel of claim 5, wherein the diffraction grating covers the entire border space.

17. The panel of claim 15, wherein
   the diffraction grating is tuned to a continuous range of grating wavelengths.

18. The panel of claim 17, wherein the diffraction grating covers the entire border space.

* * * * *